United States Patent
Jurca

[11] Patent Number: 5,938,953
[45] Date of Patent: Aug. 17, 1999

[54] LASER BEAM APPARATUS FOR MACHINING A WORKPIECE

[75] Inventor: Marius Jurca, Alzenau, Germany

[73] Assignee: JURCA Optoelektronik GmbH, Germany

[21] Appl. No.: 08/899,077

[22] Filed: Jul. 23, 1997

[30] Foreign Application Priority Data

Jul. 27, 1996 [DE] Germany ............ 196 30 437

[51] Int. Cl.$^6$ .................................. B23K 26/00
[52] U.S. Cl. .................. 219/121.83; 219/121.63; 219/121.67
[58] Field of Search ............ 219/121.63, 121.64, 219/121.83, 121.67, 121.68, 121.7, 121.72, 121.74

[56] References Cited

U.S. PATENT DOCUMENTS

| | | | |
|---|---|---|---|
| 3,781,121 | 12/1973 | Gross . | |
| 4,126,351 | 11/1978 | Drenker | 219/121.83 |
| 4,772,772 | 9/1988 | Jüptner et al. | 219/121.83 |
| 4,924,063 | 5/1990 | Buchel et al. | 219/121.83 |
| 5,155,328 | 10/1992 | Ikawa | 219/121.83 |
| 5,463,202 | 10/1995 | Kurosawa et al. | 219/121.83 |
| 5,674,415 | 10/1997 | Leong et al. | 219/121.83 |
| 5,698,120 | 12/1997 | Kurosawa et al. | 219/121.83 |

FOREIGN PATENT DOCUMENTS

| | | | |
|---|---|---|---|
| 399 117 | 3/1995 | Austria . | |
| 39 34 640 C1 | 2/1991 | Germany . | |
| 41 06 008 C2 | 2/1993 | Germany . | |
| 58-205689 | 11/1983 | Japan . | |
| 60-18288 | 1/1985 | Japan . | |
| 63-56384 | 3/1988 | Japan | 219/121.83 |
| 3-269834 | 12/1991 | Japan . | |
| 93/03881 | 3/1993 | WIPO | 219/121.83 |

*Primary Examiner*—Geoffrey S. Evans

[57] ABSTRACT

A device for machining a workpiece, for example by welding or cutting, a machining laser beam which passes through a channel in a laser machining head. An observation channel is provided in the laser machining head through which rays from the workpiece pass. A component of the rays from a specific geometrical region of the workpiece is deflected through the observation channel to a detector mounted on the laser machining head.

29 Claims, 2 Drawing Sheets

LASER BEAM APPARATUS FOR MACHINING A WORKPIECE

BACKGROUND TO THE INVENTION

The invention relates to a device for machining a workpiece, for example by welding and cutting, by means of a machining laser beam, and to a detector device for mounting on such an apparatus.

U.S. Pat. No. 5,272,312 discloses a device for machining a workpiece, for example by welding and cutting, by means of a machining laser beam, the device comprising:

(a) a laser which generates the machining laser beam;

(b) a laser machining head through which a continuous channel for the machining laser beam passes;

(c) a detector device having at least one sensor, to which sensor for purposes of monitoring and controlling the machining operation a bundle of rays coming from the workpiece is supplied.

In this device, the "secondary light" coming from the machining zone of the workpiece is used for monitoring and regulating the machining operation. "Secondary light" shall be understood to mean those light beams of different wavelength which are generated in the machined workpiece by the machining laser beam. In this connection, the secondary light is firstly UV light, which emerges from the vapour capillary produced by the machining laser beam in the workpiece. This UV radiation can be used for monitoring and regulating different welding parameters. Moreover, from the molten region of the workpiece which lags behind the vapour capillary viewed in the direction of movement of the machining head, there issues IR radiation, which can be used to monitor the quality of the welding. In particular, by means of the IR radiation, holes or pores which have been caused by material spurting out of the weld seam can be detected and documented. In the case of the apparatus described in U.S. Pat. No. 5,272,312, a sensor sensitive to UV and a sensor sensitive to IR are provided, corresponding to the different wavelength of the said rays. In the exemplary embodiment according to FIG. 4, the two sensors are combined in a common detector device. Splitting of the rays is effected corresponding to their wavelength by a mirror, which is substantially transparent to one of the two wavelengths but reflects the other wavelength.

In the case of the known welding and cutting apparatus, the detector device is a completely separate unit from the laser machining head (which is not specifically illustrated in the prior publication), and has to be housed in the constricted space between laser machining head and workpiece so that it is able to receive the secondary radiation coming from the workpiece. For reasons of geometry this is often associated with considerable problems. Sometime the detector device has to be arranged so close to the workpiece that problems with temperature arise.

SUMMARY OF THE INVENTION

In one aspect the invention provides apparatus for machining, for example welding and cutting, a workpiece by means of a machining laser beam, having (a) a laser which generates the machining laser beam;

(b) a laser machining head which has passing through it
 (i) a continuous channel for the machining laser beam, and (ii) an observation channel through which the bundle of rays coming from the workpiece passes when the device is in use, (c) a detector device having at least one sensor, to which sensor for purposes of monitoring and controlling the machining operation a bundle of rays coming from the workpiece is supplied, the detector device being mounted on the laser machining head so that it receives the bundle of rays emerging in operation from the observation channel and supplies it to the sensor.

According to the invention the bundle of rays which is to be used for monitoring and observing the work process and which is split in the detector device into component bundles of rays, is therefore first of all passed through the laser machining head. The detector device is then coupled to the laser machining head in such a manner that it receives the bundle of rays from the observation channel thereof. In this way, problems with the accessibility of the geometrical regions at the workpiece, from which the bundle of rays originates, are avoided. An additional advantage consists in that a relatively large distance from the hot regions of the workpiece is gained for the detector device containing heat-sensitive components. Benefit can then be obtained from the cooling devices which are generally located in the machining heads of high-speed welding and cutting tools. In addition, the "cross-jets" that are present already can be exploited as an effective protection against contamination.

As already mentioned, several sensors are present in the welding and cutting apparatus according to U.S. Pat. No. 5,272,312. A selective optical separating device is then provided to separate the bundle of rays coming from the workpiece into component bundles of rays which are supplied to different sensors. In such an apparatus the present invention proposes as especially advantageous the fact that the selective optical separating device is formed by at least one mirror which projects so far into the optical path of the bundle of rays that from the complete bundle of rays it splits off a component bundle of rays coming from a specific geometrical region of the workpiece and deflects it to a sensor associated with that geometrical region. Whereas the selective optical separating device described in U.S. Pat. No. 5,272,312 is based on different optical properties of the component bundles of rays which are associated with their different wavelengths, the selective optical separating device according to the invention exploits the different geometrical position of the component bundles of rays in the complete bundle of rays. In this manner the selective optical separating device can be used substantially independently of wavelength, which markedly increases its versatility in use.

Especially preferred in that connection is the practical form in which the mirror projects into the optical path of the bundle of rays in such a way that it allows the component bundle of rays coming from the vapour capillary of the workpiece to pass to a first sensor, whilst it deflects to a second sensor the component bundle of rays coming from a geometrical region in advance and/or lagging behind in the direction of the relative movement between laser machining head and workpiece. That is the embodiment of the invention which is expediently used to fulfill the same functions that are described in U.S. Pat. No. 5,272,312.

The optical separating device can here contain two mirrors, each of which deflects a respective one of two opposite component bundles of rays remote from the axis to at least one sensor. With this practical form of the invention, it is therefore possible to record or observe two geometrical regions, which, in relation to the direction of the relative movement between laser machining head and workpiece, lie on opposite sides of the vapour capillary.

The arrangement can be such that the two mirrors are adjusted over such an angle to the optical axis that they deflect the component bundles of rays associated with them onto the same sensor. In this embodiment the geometrical regions of the workpiece lying on each side of the vapour capillary are not differentiated; they are treated "symmetrically". This construction is therefore especially suitable when the apparatus is to be used without any modification in the case of two opposing directions of the relative movement between laser machining head and workpiece.

In principle it is also possible to keep the selective optical separating device described in U.S. Pat. No. 5,272,312 already mentioned, that is, a mirror selectively reflective in a specific wavelength range or selectively transparent in a specific wavelength range. But since the selectivity of such mirrors is never one hundred percent, it is advisable to supplement this known selective optical separating device with a "geometrical component". This preferably comprises arranging in the optical path in front of at least one sensor a mask which contains a through-opening, which from the complete bundle of rays directed onto the sensor lets through those rays which are coming from a specific region in the vicinity of the vapour capillary produced in the workpiece. This construction exploits the fact already mentioned above that different regions surrounding the vapour capillary emit secondary radiation of different wavelengths. Since in this construction both a selectively reflecting or selectively transparent mirror and a mask are used, it combines methods which are "optical" in the above-mentioned sense, with "geometric" methods.

In the known apparatus discussed above, only that region of the workpiece that lags behind the vapour capillary (the "weld pool"), viewed in the direction of movement of the machining head, was projected onto the sensor sensitive to IR. In two-dimensional welding ("XY-welding") it was therefore necessary to provide the detector head with an additional axis of rotation about the axis of the outgoing laser beam so that the detector head could be oriented to run behind the seam just welded. Such an additional axis of rotation is unnecessary with a construction of the invention in which in the optical path there is arranged a device, for example, a mask, which intercepts the rays coming from the weld pool or passes them on for a separate evaluation, and in which the projection lens is designed so that the rays coming from regions of the workpiece lying outside the weld pool are projected rotationally symmetrically onto a sensor.

At the end adjacent to the observation channel of the laser machining head, the detector device should have a deflecting mirror of which the inclination is adjustable. By means of this deflecting mirror it is possible to deflect all the rays coming from the region of the vapour capillary and its surroundings on the workpiece accurately into the detector device mounted on the laser machining head.

The sensors are preferably light-sensitive elements (for the appropriate wave-length, naturally), which are shielded, if necessary, against other wavelengths by suitable filters; the sensors are especially photodiodes.

It can, however, be advisable for the light-sensitive elements to be exchanged (occasionally) for CCD cameras. Direct visual observation of the area on the workpiece on which the machining laser beam is acting can be useful in many respects, for example for adjustment purposes. Even when the device is in operation this exchange facility is worthwhile: for example, the dynamics of the melt can be observed by a CCD camera onto which the corresponding component bundle of rays is imaged.

If the device needs to be designed only for a particular relative movement between workpiece and welding head, a construction can also be selected in which the selective optical separating device deflects one of the component bundles of rays it generates onto a light-sensitive element, especially a photodiode, and a different component bundle of rays it generates onto a CCD camera.

In principle it is not absolutely necessary to project the observed or recorded zone on the workpiece surface onto the sensor or sensors by an special optical system. It is nonetheless advisable for the device to contain a projection lens in the optical path of the complete bundle of rays, since separation of the individual component bundles of rays is then easier to achieve and the sensitivity of the detector device is greater.

The projection lens can in that connection be formed by a telescope.

DESCRIPTION OF PREFERRED EMBODIMENTS

Figure 1:
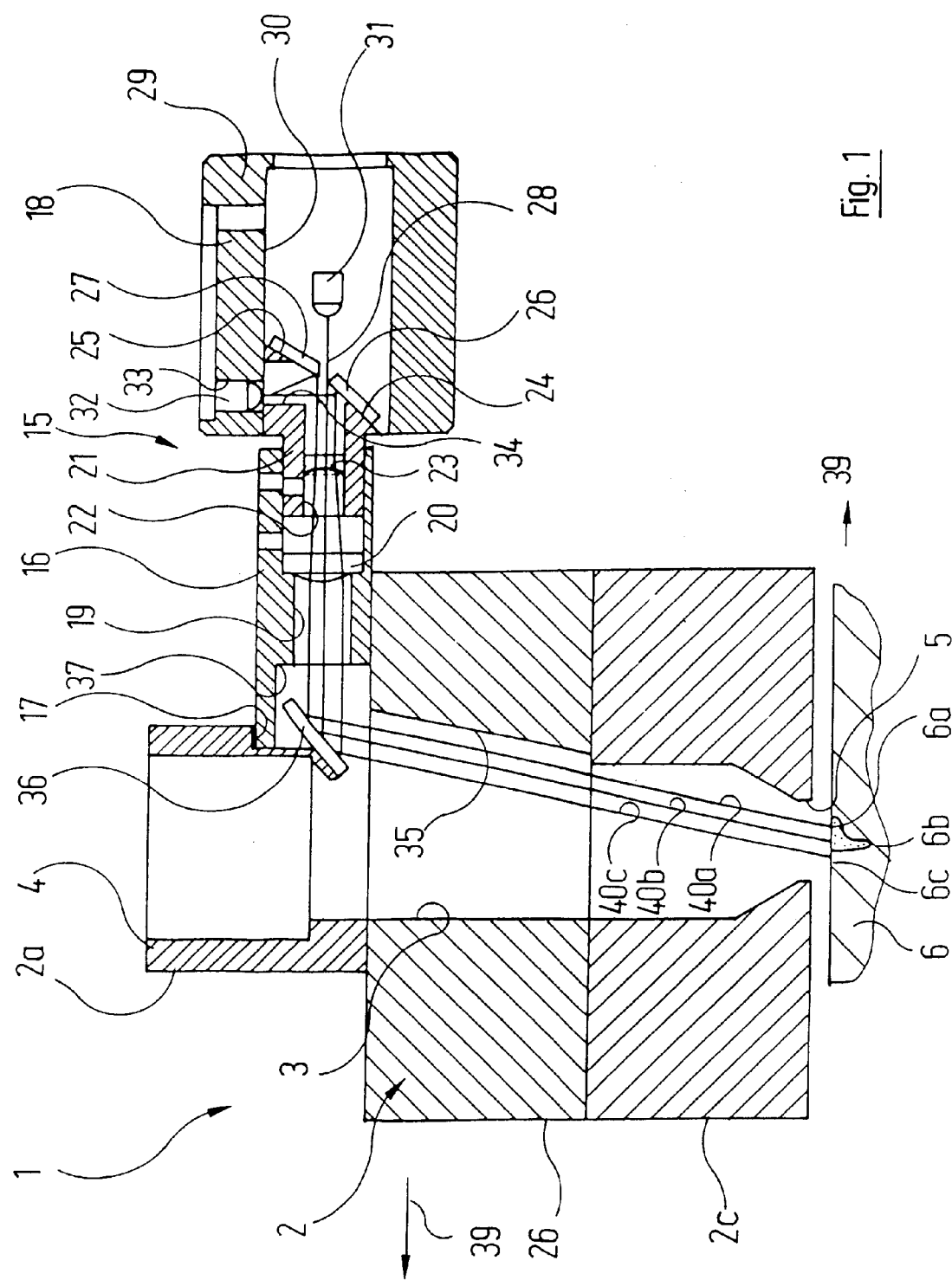
FIG. 1 is a section through a laser machining head with the detector device secured thereto.

In FIG. 1 a laser machining head is denoted as a whole by the reference number 1. It comprises a body 2 which is composed of several releasably connected members 2a, 2b, 2c. Right through the entire body 2 runs a channel 3 for the machining laser beam (not illustrated). The through-channel 3 has in the member 2a a first end 4 facing the machining laser, and in the member 2c a second end 5 which is adjacent to the workpiece 6 to be machined.

Several auxiliary channels which serve in a manner known per se for the supply of working and protective gases to the workpiece 6 and for cooling also pass through the body 2 of the laser machining head 1. The more detailed construction of these auxiliary channels is not germane to the present context; they are therefore not illustrated.

A detector device, denoted as a whole by the reference number 15, is detachably secured in a manner not illustrated more specifically to the laser machining head 1. The detector device 15 comprises a shaft-like connecting part 16, the free end of which, on the left in the drawing, is inserted in an opening 17 of the upper member 2a of the laser machining head 1, and also a detector head 18.

The connecting part 16 of the detector device 15 has a stepped bore 19 running through it, the axis of which is substantially perpendicular to the axis of the through-channel 3 in the laser machining head 1. A first plano-convex lens 20 is arranged against the step which is formed between the region of smaller diameter and the region of larger diameter of the stepped bore 19.

The detector head 18 of the detector device 15 is provided with a neck-like extension piece 21, which is inserted into the region of larger diameter of the stepped bore 19 of the connecting part 16. A stepped bore 22, which is coaxial with the stepped bore 19 in the connecting part 16, likewise runs through the neck-like extension piece 21 of the detector head 18. A second plano-convex lens 23 is arranged against the step which is formed between the region of larger diameter and the region of smaller diameter of the stepped bore 22 in the neck-like extension piece 21. The lenses 20 and 23 form a telescope, the image-forming properties of which can be adjusted by introducing the neck-like extension piece 21 of the detector head 18 to a greater or lesser extent into the stepped bore 19 of the connecting part 16. The respective correct relative position of the detector head 18 with respect to the connecting part 16 and thus the distance between the two lenses 20, 23 of the telescope can be fixed in a suitable manner, not illustrated in the drawing.

The neck-like extension piece 21 of the detector head 18 is provided at its end lying inside the detector head 18 with two supporting surfaces 24, 25 which are set at different angles to the axes of the stepped bores 19, 22 and thus to the axis of the telescope formed by the lenses 20, 23. Secured to each of the two supporting surfaces 24, 25 is a respective mirror 26, 27. The two mirrors 26, 27 come with their edges facing one another comparatively close up to the optical axis of the detector device 15, so that between the two mirrors 26, 27 there remains a comparatively narrow gap 28 in the region of the optical axis.

The neck-like extension piece 21 is joined to a substantially hollow-cylindrical housing 29 of the detector head 18 and can, if appropriate, also be integral therewith. Inside the interior 30 of the housing 29 a first sensor 31 is arranged on the optical axis of the detector device 15; this sensor can be, in particular, a sensor sensitive to UV.

A second sensor 32, which in the embodiment illustrated is designed as an IR-sensitive sensor, is located in a radial bore 33 of the housing 29. A radial bore 34 in the neck-like extension piece 21 of the detector head 18 provides a connection between the sensor 32 and the stepped bore 22.

Through the body 2 of the laser machining head 1 runs an observation channel 35, which lies at an acute angle to the axis of the through-channel 3 for the machining laser beam and which can be seen in particular in the member 2b of the laser machining head 1. A deflecting mirror 36, the inclination which can be changed, in a manner not illustrated more specifically, for adjustment of the ray path, is secured at the upper end of the observation channel 35, in the embodiment illustrated in the member 2a of the laser machining head 1. In the embodiment illustrated here, the deflecting mirror 36 is housed partly in a connecting chamber 37; this connecting chamber is formed in the end region of the connecting part 16 of the detector device 15 mounted on the laser machining head 1 and produces a connection between the stepped bore 19 of the detector device 15 and the observation channel 35 of the laser machining head 1.

The above-described laser machining head 1 with attached detector device 15 operates as follows:

For cutting, welding or other machining of the workpiece 6 a machining laser beam is focused onto the workpiece through the through-channel 3 of the laser machining head 1. The machining laser beam fuses the workpiece 6 and in so doing produces in it in a manner known per se a vapour capillary, which is indicated in the drawing by the reference number 6b. The workpiece 6 is advanced in the direction denoted by the arrow 39 such that in the region of the workpiece 6 in advance of the crossover point of the machining laser beam a melt forms, which melt solidifies as the distance from the vapour capillary 6b increases.

It is known that different radiations emanate from the region of the workpiece 6 lying in the vicinity of the weld pool and that these radiations can be used to monitor the machining process and regulate the same. The reader is referred to U.S. Pat. No. 5,272,312 already mentioned in the introduction for details. In the present context it is sufficient to know that radiation in the UV range between about 200 nm and 450 nm leaves the actual vapour capillary 6b, from which certain information about the welding operation itself can be obtained. The molten or intensely heated region of the workpiece 6 which lies in front of the vapour capillary 6b in the direction of movement 39 on the other hand transmits IR radiation, especially in the range between 800 nm and about 1300 nm, which can be used for quality control of the resulting welding seam or similar, and which in particular provides information about the extent to which holes or pores have formed in the resulting welding seam or similar.

In comparison, the region 6c of the workpiece 6 lagging behind in the direction of movement 39 has not yet been caught up in the actual welding and therefore generally also radiates no or only negligibly little characteristic radiation. Nonetheless it can be useful to observe this region under external illumination. Details of this are given further below.

All regions 6a to 6c of the workpiece 6 are observed and scanned with the detector device 15. For a more detailed explanation, a ray emanating from each of these three geometrical regions 6a to 6c is illustrated in the drawing as representative of a corresponding component bundle of rays:

An IR ray emanating from the region 6a of the workpiece 6 bears the reference number 40a. A UV ray emerging from the immediate weld pool, that is, the mouth of the vapour capillary 6b, is provided with the reference number 40b. A ray emanating from the still comparatively cool region 6c of the workpiece in advance of the vapour capillary 6b in the direction of movement 39, which may be, for example, an external light ray, is characterised by the reference number 40c.

All of the singled-out rays 40a, 40b, 40c pass through the observation channel 35 of the laser machining head 1 and are reflected by the deflecting mirror 36 into the stepped bore 19 of the detector device 15. The rays 40a to 40c then pass through the two telescope lenses 20 and 23, the complete bundle of rays changing its diameter, and strike at the end of the stepped bore 22 of the detector head 18 on the selective optical separating device formed by the two mirrors 26 and 27.

The ray 40a coming from the region 6a of the workpiece 6, which (like all the rays coming from that region) is to be found in the upper region of the complete bundle of rays, meets the upper mirror 27 and is reflected by it (because of its corresponding inclined position with respect to the optical axis) onto the IR sensor 32.

The ray 40b, which comes from the region 6b of the workpiece 6, lies inside the complete bundle of rays comparatively close to the axis and therefore passes, as apparent from the drawing, through the gap 28 between the mirrors 26 and 27 and then meets the UV sensor 31.

Finally, the ray 40c which comes from the region 6c of the workpiece 6, lying inside the bundle in that region remote from the axis which is shown at the bottom in the drawing, therefore meets the mirror 26 and (because of the somewhat different inclined position with respect to the optical axis compared with the mirror 27) is likewise reflected onto the IR sensor 32. As is evident, it is possible by means of the described detector device 15, to separate the component bundle of rays 40b close to the axis coming from the region 6b of the workpiece 6 from the component bundles of rays 40a, 40c remote from the axis coming from the regions 6a and 6c of the workpiece 6 lying respectively in advance and lagging behind with respect to the direction of movement of the workpiece 6, so that separate processing of the signals obtained in the sensors 31 and 32 is possible.

The exemplary embodiment illustrated in the drawings is primarily intended for the problem already known from U.S. Pat. No. 5,272,312, both of observing the UV rays 40b which come from the vapour capillary 6b during welding and cutting of the workpiece 6 and providing information about the welding parameters, and also of detecting the rays 40a which come from the melt or the material just solidifying and obtaining information about any porosity or holes in the welding seam. Rays 40c, which come from the region 6c lagging behind in the direction of movement 39 of the workpiece are therefore not included in this normal mode of operation. The purpose of the duplicate arrangement of the mirrors 26 and 27 in this apparatus is that the welding direction 39 can, if appropriate, be reversed, without having to make changes to the apparatus. Then, the region 6c of the workpiece 6 would represent the region in advance in the direction of movement of the workpiece 6 which emits the IR rays. In this case the deflecting mirror 26 comes into operation.

From the above remarks it is clear that conversely it is possible, if appropriate, to use just one mirror instead of two mirrors 26 and 27, if the detector device 15 is always operated only with one direction of relative movement between laser machining head 1 and workpiece 6.

The sensors 31 and 32 can (from time to time) be replaced by television cameras (CCD cameras), not illustrated, for adjustment of the detector device 15.

In a exemplary embodiment not illustrated, a television camera is permanently installed in the housing 29 of the detector head 18 in addition to the IR sensitive sensor 32. The two mirrors 26 and 27 are then, unlike the exemplary embodiment illustrated in the drawings, adjusted with respect to the optical axis of the detector device 15 in such a way that one of these two mirrors 26 and 27 continues to image onto the IR sensor 32 the region 6a lagging behind in the direction of movement 39 of the laser machining head 1, whilst the other mirror 26, 27 images the region 6c in advance onto the television camera for observation purposes. For that purpose the region 6c of the workpiece 6 can be illuminated with external light, as already stated above.

Figure 2:
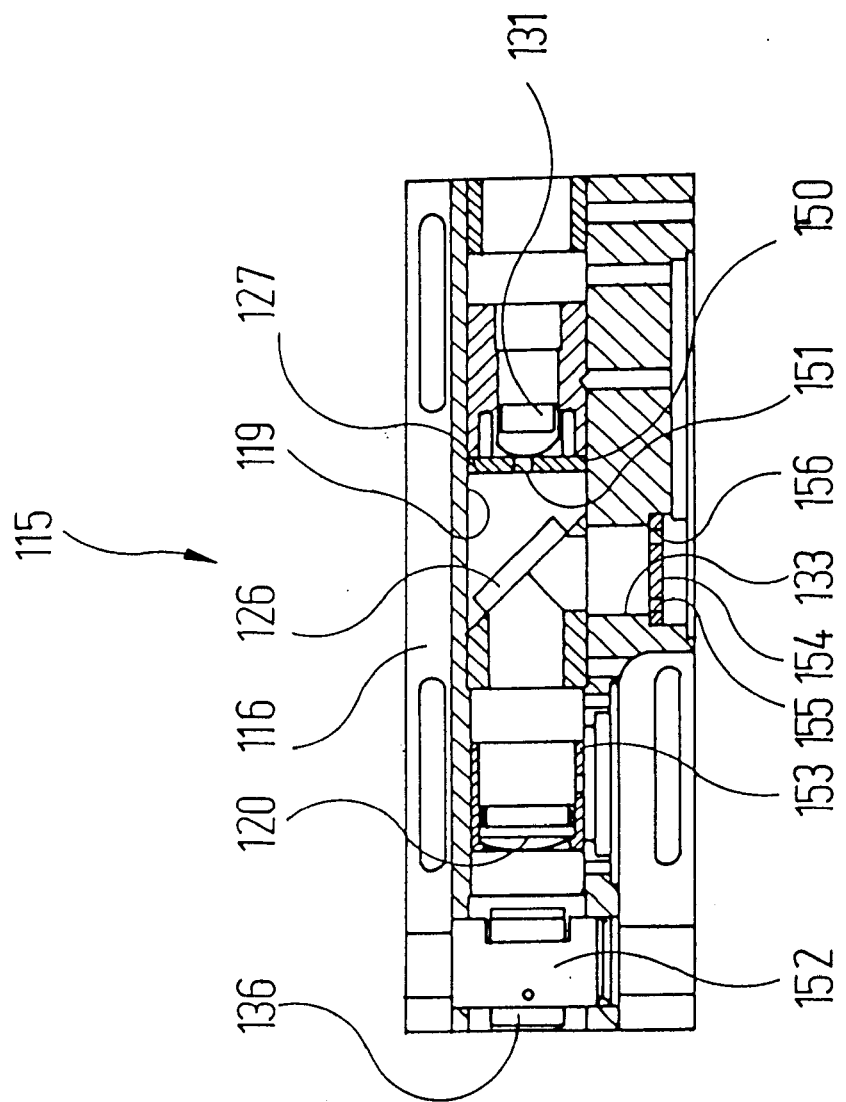
FIG. 2 is a section through an alternative embodiment of the detector device, the section plane being at right angles to the plane of drawing of FIG. 1.

FIG. 2 illustrates a second exemplary embodiment of a detector device 115, which can be mounted on the laser machining head 1 in place of the detector device 15 of FIG. 1. The section plane of FIG. 2 is perpendicular to that of FIG. 1; the viewing direction in FIG. 1 is therefore from top to bottom. The detector device 115 shown in FIG. 2 is similar to the detector device 15 of FIG. 1 in many respects; corresponding parts are therefore denoted by the same reference numbers increased by 100. The following description is restricted to the explanation of differences between the two exemplary embodiments.

The detector device 115 of FIG. 2 has a one-piece external housing 116 over the entire axial length, into the inner space of which the various components are inserted and secured. Reappearing from FIG. 1 are, from left to right in FIG. 2, the deflecting mirror 136, which is held in a guide part 152 rotatable in the housing 116, and the plano-convex lens 120, which is part of the imaging telescope and is slidably guided in a sleeve 153. The bundle of rays which has passed through the telescope now meets a mirror 126 set at an angle of approximately 45° to the optical axis, which is selectively transparent to a certain wavelength range. Instead of a selective transmittance, a selective reflectivity can also be chosen. This means that from the bundle of rays as a whole which passes through the telescope and comes from the region 6a to 6c of FIG. 1 surrounding the vapour capillary 6b, only specific rays of a specific wavelength, for example only rays from the region 6b of the vapour capillary itself, are allowed through the mirror 126. This component bundle of rays continues on its way along the optical axis and falls on a mask 150 which has a through-opening 151. The position and form of this mask are selected so that the rays passing through the through-opening 151 derive exclusively from the desired region of the workpiece, for example from the region of the vapour capillary 6b. The through-opening 151 of the mask 150 thus represents a feature supplementing the selectivity of the mirror 126, so that the selectively reflecting mirror 126, together with the mask 150, in this exemplary embodiment forms the optically selective separating device. The now optically (according to wavelength) and also geometrically separated rays meet the first sensor 131, which can be, for example, a UV sensor.

By reflection at the mirror 126, a second component bundle of rays of a different wavelength is created, which originates from one or more other region(s) of the workpiece 6, eg. from the regions 6a and 6c, and is deflected with respect to the optical axis of the detector device 115 through about 90° and is directed into a radial bore 133 of the housing 116. This radial bore 133 leads to a second sensor, not illustrated in FIG. 2, which can then be, for example, an infrared sensor. This sensor also has in front of it a mask 154 which has through-openings 155, 156. The form and position of these through-openings 155 and 156 of the mask 154 are selected so that the corresponding regions (in the example the region 6a and 6c) of the workpiece 6 are imaged onto them, that is, only radiation coming from these regions (in the example 6a and 6c) is able to reach the second sensor.

Of course, in the detector device 115 according to FIG. 2 the sensor 131 and the second sensor not illustrated could, if need be, also be replaced by television cameras (CCD cameras). The mode of operation of this detector device 115 corresponds to a large extent to the mode of operation which was described above for the detector device 15; reference can be made to that description.

What is claimed is:

1. Apparatus for machining a workpiece by a machining laser beam, having
   (a) a laser which generates the machining laser beam;
   (b) a laser machining head which has passing through it
       (i) a continuous channel for the machining laser beam, and (ii) an observation channel through which a bundle of rays coming from the workpiece passes when the device is in use,
   (c) a detector device having at least one sensor, to said at least one sensor for purposes of monitoring and controlling the machining operation a bundle of rays coming from the workpiece is supplied, the detector device being mounted on the laser machining head so that it receives the bundle of rays emerging in operation from the observation channel and supplies it to the sensor in which several sensors are present and a selective optical separating device is provided which separates the bundle of rays coming from the workpiece into component bundles of rays which are supplied to different sensors, the selective optical separating device being formed by at least one mirror which projects so far into the optical path of the bundle of rays that from the complete bundle of rays it splits off a component bundle of rays coming from a specific geometrical region of the workpiece and deflects it to a sensor associated with that geometrical region, and in which the mirror projects into the optical path of the bundle of rays in such a way that it allows the component bundle of rays coming from the vapour capillary of the workpiece to pass to a first sensor, whilst it deflects to a second sensor the component bundle of rays coming from the geometrical region in advance of or lagging behind the vapour capillary in the direction of relative movement between laser machining head and workpiece.

2. Apparatus according to claim 1, which comprises two mirrors, each of which deflects a respective one of two opposite component bundles of rays remote from the axis to at least one sensor.

3. A detector device for mounting on an apparatus according to claim 2, in which in the optical path there is arranged a device, which intercepts the rays coming from the weld pool or passes them on for a separate evaluation, and the projection lens is designed so that the rays coming from regions lying outside the weld pool are projected rotationally symmetrically onto a sensor.

4. Apparatus according to claim 2, in which the two mirrors are placed at such an angle to the optical axis that they deflect the component bundles of rays associated with them onto the same sensor.

5. A detector device for mounting on an apparatus according to claim 4, in which in the optical path there is arranged a device, which intercepts the rays coming from the weld pool or passes them on for a separate evaluation, and the projection lens is designed so that the rays coming from regions lying outside the weld pool are projected rotationally symmetrically onto a sensor.

6. Apparatus according to claim 1, in which the selective optical separating device is formed by a mirror selectively reflecting in a specific wavelength range or selectively transparent in a specific wavelength range, and in which a mask which contains at least one through-opening is provided in the optical path in front of at least one sensor, the mask selectively permitting through passage of rays which are coming from at least one specific region in the vicinity of the vapour capillary produced in the workpiece.

7. Apparatus according to claim 1, in which a device is positioned in the optical path to intercept rays coming from a weld pool or passes them on for a separate evaluation, the projection lens being designed so that the rays coming from regions of the workpiece lying outside the weld pool are projected rotationally symmetrically onto a sensor.

8. Apparatus according to claim 1, in which the detector device has a deflecting mirror at the end adjacent to the observation channel of the laser machining head, the inclination of the mirror being adjustable.

9. Apparatus according to claim 1, in which the sensors are light-sensitive elements.

10. Apparatus according to claim 9, which includes at least one CCD camera which can be exchanged for the light-sensitive elements.

11. Apparatus according to claim 10, in which the selective optical separating device deflects one of the component bundles of rays it generates onto a light-sensitive element, especially a photodiode, and a different component bundle of rays it generates onto a CCD camera.

12. A detector device for mounting on an apparatus according to claim 11, in which in the optical path there is arranged a device, which intercepts the rays coming from the weld pool or passes them on for a separate evaluation, and the projection lens is designed so that the rays coming from regions lying outside the weld pool are projected rotationally symmetrically onto a sensor.

13. Apparatus according to claim 1, which contains a projection lens in the optical path of the complete bundle of rays.

14. Apparatus according to claim 13, in which the projection lens is provided by a telescope.

15. A detector device for mounting on an apparatus according to claim 1, characterized in that in the optical path there is arranged a device which intercepts the rays coming from the weld pool or passes them on for a separate evaluation, and a projection lens is designed so that the rays coming from regions lying outside the weld pool are projected rotationally symmetrically onto a sensor.

16. A detector device for mounting on apparatus for machining a workpiece by a machining laser beam, in which several sensors are present and a selective optical separating device is provided which separates the bundle of rays coming from the workpiece into component bundles of rays which are supplied to different sensors, the selective optical separating device being provided by at least one mirror which projects so far into the optical path of the bundle of rays that from the complete bundle of rays it splits off a component bundle of rays coming from a specific geometrical region of the workpiece and deflects it to a sensor associated with that geometrical region, in which the selective optical separating device deflects one of the component bundles of rays it generates onto a light-sensitive element, and a different component bundle of rays it generates onto a CCD camera.

17. A detector device according to claim 16, which has a deflecting mirror at the end adjacent to the observation channel of the laser machining head, the inclination of the mirror being adjustable.

18. A detector device according to claim 16, in which the sensors are light-sensitive elements.

19. A detector device according to claim 16, which includes at least one CCD camera which can be exchanged for the light-sensitive elements.

20. A detector device according to claim 16, which contains a projection lens in the optical path of the complete bundle of rays.

21. A detector device according to claim 16, in which the projection lens is formed by a telescope.

22. Apparatus for machining a workpiece by a machining laser beam, having,
 (a) a laser which generates the machining laser beam;
 (b) a laser machining head which has passing through it
  (i) a continuous channel for the machining laser beam, and (ii) an observation channel through which a bundle of rays coming from the workpiece passes when the device is in use,
 (c) a detector device having at least one sensor, to said at least one sensor for purposes of monitoring and controlling the machining operation a bundle of rays coming from the workpiece is supplied, the detector device being mounted on the laser machining head so that it receives the bundle of rays emerging in operation from the observation channel and supplies it to the sensor, in which the sensors are light-sensitive elements, and including at least one CCD camera which can be exchanged for the light-sensitive elements, in which the selective optical separating device deflects one of the component bundles of rays it generates onto a light-sensitive element, especially a photodiode, and a different component bundle of rays it generates onto a CCD camera.

23. A detector device according to claim 22, which contains two mirrors, each of which deflects a respective one of two opposite component bundles of rays remote from the axis to at least one sensor.

24. A detector device according to claim 23, in which the two mirrors are placed at such an angle to the optical axis that they deflect the component bundles of rays associated with them onto the same sensor.

25. A detector device for mounting on apparatus for machining a workpiece by a machining laser beam, in which several sensors are present and a selective optical separating device is provided which separates the bundle of rays coming from the workpiece into component bundles of rays which are supplied to different sensors, and comprises a mirror selectively reflecting in a specific wavelength range or selectively transparent in a specific wavelength range, in which a mask is arranged in the optical path in front of at least one sensor, the mask containing at least one through opening, which from the complete bundle of rays directed onto the sensor lets through those rays which are coming from at least one specific region in the vicinity of the vapour capillary produced in the workpiece.

26. Apparatus for machining a workpiece by a machining laser beam, having, (a) a laser which generates the machining laser beam;

(b) a laser machining head which has passing through it (i) a continuous channel for the machining laser beam, and (ii) an observation channel through which a bundle of rays coming from the workpiece passes when the device is in use, (c) a detector device having at least one sensor, to said at least one sensor for purposes of monitoring and controlling the machining operation a bundle of rays coming from the workpiece is supplied, the detector device being mounted on the laser machining head so that it receives the bundle of rays emerging in operation from the observation channel and supplies it to the sensor, in which the selective optical separating device is formed by a mirror selectively reflecting in a specific wavelength range or selectively transparent in a specific wavelength range or selectively transparent in a specific wavelength range, and in which a mask which contains at least one through-opening is provided in the optical path in front of at least one sensor, the mask selectively permitting through passage of rays which are coming from at least specific region in the vicinity of the vapour capillary produced in the workpiece.

27. A detector device for mounting on an apparatus according to claim 26, in which in the optical path there is arranged a device, which intercepts the rays coming from the weld pool or passes them on for a separate evaluation, and the projection lens is designed so that the rays coming from regions lying outside the weld pool are projected rotationally symmetrically onto a sensor.

28. A detector device for mounting on apparatus for machining a workpiece by means of a machining laser beam, in which several sensors are present and a selective optical separating device is provided which separates the bundle of rays coming from the workpiece into component bundles of rays which are supplied to different sensors, the selective optical separating device being provided by at least one mirror which projects so far into the optical path of the bundle of rays that from the complete bundle of rays it splits off a component bundle of rays coming from a specific geometrical region of the workpiece and deflects it to a sensor associated with that geometrical region, in which the mirror projects into the optical path of the bundle of rays in such a way that it allows the component bundle of rays coming from the vapour capillary of the workpiece to pass to a first sensor, whilst it deflects to a second sensor the component bundle of rays which is coming from the geometrical region in advance of or lagging behind the vapour capillary in the direction of relative movement between laser machining head and workpiece.

29. A detector device for mounting on apparatus for machining a workpiece by a machining laser beam, in which several sensors are present and a selective optical separating device is provided which separates the bundle of rays coming from the workpiece into component bundles of rays which are supplied to different sensors, the selective optical separating device being provided by at least one mirror which projects so far into the optical path of the bundle of rays that from the complete bundle of rays it splits off a component bundle of rays coming from a specific geometrical region of the workpiece and deflects it to a sensor associated with that geometrical region, which has a deflecting mirror at the end adjacent to the observation channel of the laser machining head, the inclination of the mirror being adjustable.

* * * * *